March 29, 1966 R. U. CLARK 3,243,361

METHOD OF INITIATING ELECTROLESS PLATING

Filed May 18, 1962

Richard U. Clark

INVENTOR.

United States Patent Office 3,243,361
Patented Mar. 29, 1966

3,243,361
METHOD OF INITIATING ELECTROLESS PLATING

Richard U. Clark, 4 Orchard Drive, West Acton, Mass.
Filed May 18, 1962, Ser. No. 195,866
1 Claim. (Cl. 204—38)

Figure 1:
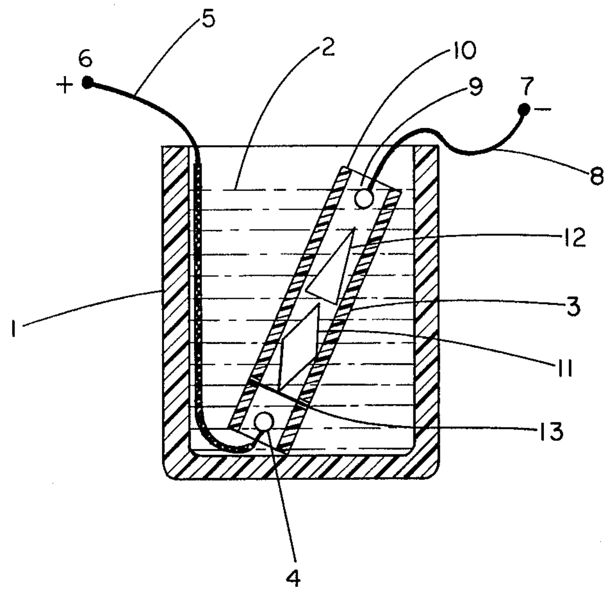

The present invention has to do with the plating of metal coatings onto conductive materials and especially that type of plating known as electroless plating. This latter plating normally requires that certain non-catalytic surfaces such as copper, lead and so forth be catalyzed with a coat of say palladium chloride or similar before plating can be initiated in the electroless plating bath, especially of the composition of the nickel and cobalt baths for electroless plating described in the patents U.S. 2,532,283 and 2,532,284, to Brenner et al. issued December 5, 1950.

One objection to the catalytic treatment of surfaces to initiate the electroless plating operation arises in the case of the plating of objects such as printed circuits on metallized insulators wherein only the metal banded sections are desired to be plated. Catalyzing combined conductive and non-conductive surfaces causes the object so treated to be plated in its entirety in an electroless bath, unless costly masking of areas desired to remain unplated is resorted to, and would thus defeat the use of the electroless plating step in such objects as printed circuits, metallized insulators and so forth.

One object of the present invention is to provide a means of initiating electroless plating of conductive surfaces of noncatalytic metal overlayed on nonconducting substrates without resorting to the hitherto necessary treatment with a catalyzing bath before plating.

Another object of the invention is to initiate selective electroless platings of metal on a combined conductive and non-conductive surface in such a manner that only the conductive areas are plated.

Still a further object is to initiate electroless plating of metal in various baths without the need of making any direct electrical connections by wires or the like to the objects being plated.

Although claims have been made that certain types of electroless plating solutions of nickel or the like will plate directly onto copper surfaces without prior catalyzing it has been found that such plating is slow in starting, hard to initiate and does not always give satisfactory end products.

The present invention provides for the initiation of electroless plating of nickel and the like onto copper and other noncatalytic metals by the expedient of placing the objects to be plated in the electroless plating solution and providing a starting potential drop of current across the surface of the item to be plated.

To accomplish the above objective the items to be plated are placed within a confined area of electrolyte and are therein positioned between two spaced electrodes, which can be of the metal being deposited. A suitable current is then passed between said two electrodes long enough to initiate plating onto the intermediately placed items to be plated. As soon as such plating starts within the bath the initiating current may be shut off where the metal being deposited is of a catalytic nature. In the latter event deposition of the plating metal will continue by the catalytic reduction of the same aided by the bath's chemical reducing agent. I can also electroplate using FIG. 1 and alternating current. Initiation of the electroless plating will take place after electroexcitation for a period of from five seconds to twenty-five seconds.

A bath suitable for the above mentioned operation and as described in the patents to Brenner U.S. 2,532,283 and 2,532,284 can be made up as outlined therein from the metal chloride, sodium hypophosphite, and sodium citrate in water, the normal for nickel being 4 ounces per gallon, 1.3 ounces per gallon, and 1.3 ounces per gallon respectively, to a pH value of 4 to 6, and for use at from 90 degrees C. to a few degrees higher or lower. The parts to be plated are of course pre-cleaned.

Turning now to the drawing which forms a part of this application, a cross-sectional view of one form of apparatus designed for use with the present invention is shown in the figure.

It will be obvious to anyone skilled in the art of metal plating that many variations of form of the depicted equipment may be made up for various types of parts that are desired to be plated, as will be pointed out more completely after the detailed description of the drawing has been given.

The embodiment in FIGURE 1 consists of plating solution container 1, of glass or other suitable non-conducting material filled with the solution 2. In this is placed an open ended sluce like tube 3 of glass, ceramic, plastic or other suitable non-conducting solution proof material. At the lower end of this sluce like tube is placed a suitable metal electrode 4, having an insulated conductor 5 attached thereto, said conductor in turn being connected to one terminal of a low voltage power source, of 4 or more volts, at 6. At 7 the other terminal of the power source is connected to a lead 8 having an electrode 9 at its free end. This electrode 9 is immersed in the solution at the remaining end of the sluce tube at the point 10.

At the end of the tube at 10 the sluce protrudes slightly out of the plating solution 2 in such a manner that when current is passed from one electrode to the other practically all of the potential drop takes place within the confines of the sluce tube. A rest for parts positioning is shown at 13.

The sluce tube just mentioned contains the articles to be plated as shown at 11 and 12 intermediate the electrodes. It is of course possible to provide the container 1 with several sluce tubes and the respective electrodes. These electrodes do not touch the parts being plated. They are used to provide a flow of ions of metal from the solution to the parts to be plated therein to which they are attracted by the potential difference set up by the gradient across the plating solution. Once the plating action takes place the exciting current may be turned off and the plating process will then continue by the catalytic reduction effects. Since no connection is made directly to the parts being plated and the electrodes, the plating action may be initiated by the application of either direct or alternating current to the electrode terminals. The objects to be plated should not come into contact with each other at any of their conductive areas.

The use of alternating current in initiating the plating action has certain advantages. It can be obtained directly from a stepdown transformer without the need of a rectifier, and any effective reaction at the electrodes would be equal at both contacts with the bath.

Electroless plating, as with most other methods is best accomplished at an elevated temperature. This temperature may be maintained very accurately by regulated applications of the initiating current, and since this flows through a restricted volume of electrolyte accurate control can be had with the use of very little energy. I can also apply alternating currents of high frequency to the solution and move, rotate or vibrate the parts being plated at various frequencies to obtain an optimum quality of plating in my method. I may also plate printed circuits in shallow trays etc.

Having described my invention I claim:

A method of initiating the electroless plating of metallic objects out of contact with each other in an electroless plating solution confined in a non-conductive sluce way member having two open ends, one end opening into a tank containing said electroless plating solution and the other end extending out of the said solution, the said sluce way containing within the solution at each end thereof an electroexcited potentially related electrode, said electrode making no direct contact with the objects to be plated but providing a flow of current through said sluce contained solution, the said current to be terminated as soon as the electroless plating solution has deposited an observable coating from its constituents onto said objects.

References Cited by the Examiner

UNITED STATES PATENTS

| | | | |
|---|---|---|---|
| 2,658,839 | 11/1953 | Talmey | 117—113 |
| 2,955,959 | 10/1960 | Da Rose | 117—113 |

OTHER REFERENCES

Brenner et al.: Research Paper RP 1835, vol. 39, Nov. 1947 of Department of Commerce National Bureau of Standards.

JOHN H. MACK, *Primary Examiner.*

JOHN R. SPECK, *Examiner.*

J. BATTIST, *Assistant Examiner.*